(No Model.)
W. H. BENNETT.
SAW MILL DOG.
No. 335,419. Patented Feb. 2, 1886.
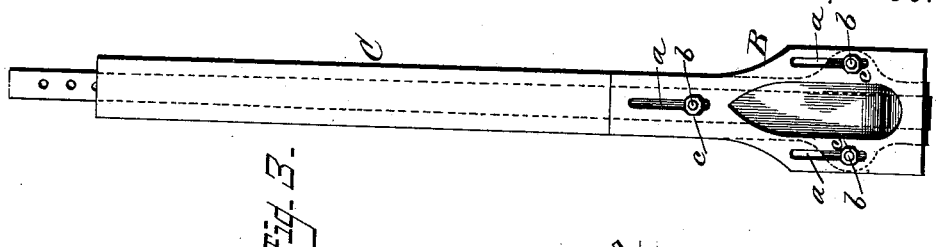
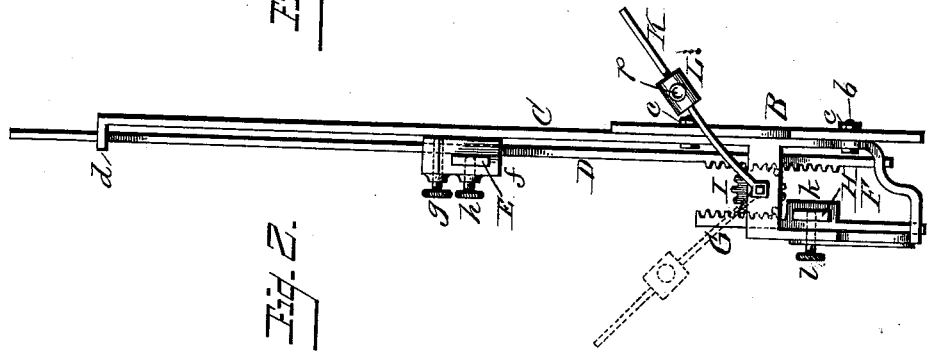
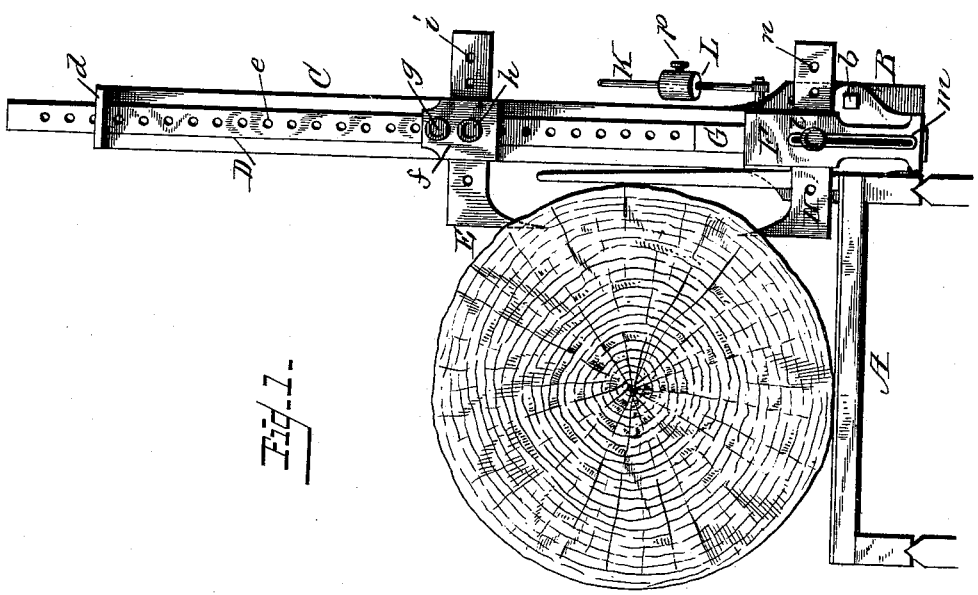
Witnesses
Inventor
William H. Bennett
By his Attorney
Chas. H. Fowler

UNITED STATES PATENT OFFICE.

WILLIAM H. BENNETT, OF PERU, INDIANA.

SAW-MILL DOG.

SPECIFICATION forming part of Letters Patent No 335,419, dated February 2, 1886.

Application filed August 24, 1885. Serial No. 175,140. (No model.)

*To all whom it may concern:*

Be it known that I, WILLIAM H. BENNETT, a citizen of the United States, residing at the city of Peru, in the county of Miami and State of Indiana, have invented certain new and useful Improvements in Saw-Mill Dogs; and I do hereby declare that the following is a full, clear, and exact description of the same, reference being had to the annexed drawings, making a part of this specification, and to the letters and figures of reference marked thereon.

Figure 1 of the drawings is a side elevation of my improved saw-mill dog, showing it in use; Fig. 2, an edge view thereof, and Fig. 3 a side view reverse to that shown in Fig. 1.

The present invention has for its object to provide a simple and effective saw-mill dog, in which the dogs proper may be quickly operated simultaneously to grab the log or piece of board; and it consists in the details of construction, substantially as shown in the drawings and hereinafter described and claimed.

In the accompanying drawings, A represents the head-block of a saw-mill, to which the plate B is attached in any suitable manner, said plate supporting in position my improved device. This plate B is provided with elongated slots $a$, extending lengthwise thereof, through which pass the screw-threaded ends of headed bolts $b$ upon the lower end of a standard, C, whereby said standard is vertically adjustable to increase or diminish its height with relation to the head-block, and is held in its adjusted position by the nuts $c$ on the ends of the bolts, as shown more clearly in Fig. 3.

The standard C at its upper end is formed with an inwardly-extending slotted guide, $d$, through which extends the upper end of a rack-bar, D, the teeth thereof at its lower end extending only a short distance of its length. The bar D above the rack-teeth has perforations $e$, and on the bar slides a bracket, $f$, which carries the upper dog, E. The bracket $f$ is vertically adjustable on the bar D, and the dog E longitudinally adjustable in the bracket, the pin $g$, which engages with one of the series of perforations $e$, holding the bracket in its adjusted position, while the pin $h$, engaging with the perforations $i$ in the dog, holds the latter stationary after proper adjustment. This vertical and longitudinal or horizontal adjustment to regulate the height and length of the dog may be accomplished by any other means, as found desirable, and therefore I do not desire to be understood as limiting my invention to the construction shown, as any well-known means that will serve the same end may be employed.

The lower end of the standard C terminates in a frame, F, which has a slot to correspond with the slot in the guide $d$, through which extends the lower end of the rack-bar D, thus holding the bar in a true vertical line, and enabling it to be moved up and down, by the means hereinafter described.

To the frame F is held a second rack-bar, G, formed with a slotted bracket, $k$, through which extends the shank of the lower dog, H, held in its horizontal adjustment by screw or pin $l$. This pin $l$ passes through an elongated slot, $m$, in the frame F, and engages with one of the perforations $n$ in the shank of the dog H, the slot $m$ enabling the rack-bar G to move vertically, the pin traveling up and down the slot without affecting the movement of the rack-bar. These rack-bars D G are both operated by a pinion, I, which is keyed to a short shaft, having its bearing in the frame F. To this shaft is connected one end of a lever, K, provided with an adjustable weight, L, made adjustable on the lever by a set-screw, $p$, or any other suitable means.

Having raised the lower dog to bring it against the log, and lowered the bracket $f$ to bring the upper dog down upon the log, both dogs are then forced into it by bringing the lever K in position shown in full lines, Fig. 2. Thus, by means of the rack-and-pinion movement, the dogs are made to simultaneously grab and hold the log in position, and preventing any change while the saw is running through, the adjustment of the weight on the lever increasing its power or regulating it as circumstances require.

Having now fully described my invention, what I claim as new, and desire to secure by Letters Patent, is—

1. In a saw-mill dog, the combination, with two rack-bars, each carrying adjustable dogs, of a pinion which gears with and operates said rack-bars, and a lever for operating it, provided with a weight, substantially as and for the purpose specified.

2. In a saw-mill dog, the combination of two rack-bars carrying dogs, a pinion for operating them in opposite directions, and a lever connected to said pinion and provided with an adjustable weight, substantially as and for the purpose described.

3. In a saw-mill dog, an adjustable standard provided with a slotted guide at its upper end, and at its lower end terminating in a frame having guide-slots, in combination with two opposite moving rack-bars, each carrying a dog, a pinion for operating them, and a lever provided with an adjustable weight connected to said pinion, substantially as and for the purpose specified.

In testimony that I claim the above I have hereunto subscribed my name in the presence of two witnesses.

WILLIAM H. BENNETT.

Witnesses:
JAMES M. BROWN,
L. D. MILLER.